(12) United States Patent
Minagoshi

(10) Patent No.: US 7,374,527 B2
(45) Date of Patent: May 20, 2008

(54) RUBBER ROLLER FOR IMAGE-FORMING APPARATUS

(75) Inventor: Akira Minagoshi, Hyogo (JP)

(73) Assignee: Sumitomo Rubber Industries, Ltd., Kobe-shi, Hyogo (JP)

( * ) Notice: Subject to any disclaimer, the term of this patent is extended or adjusted under 35 U.S.C. 154(b) by 0 days.

(21) Appl. No.: 11/714,257

(22) Filed: Mar. 6, 2007

(65) Prior Publication Data

US 2007/0244285 A1 Oct. 18, 2007

(30) Foreign Application Priority Data

Apr. 14, 2006 (JP) .............................. 2006-112644

(51) Int. Cl.
*A01B 29/00* (2006.01)
*G03G 15/00* (2006.01)

(52) U.S. Cl. .................. 492/30; 492/56; 399/176; 428/36.8

(58) Field of Classification Search ................. 492/30, 492/56; 399/176; 428/36.8
See application file for complete search history.

(56) References Cited

U.S. PATENT DOCUMENTS 7,149,466 B2 * 12/2006 Mizumoto ............... 399/357

FOREIGN PATENT DOCUMENTS

| JP | 2003-154631 A | 5/2003 |
|---|---|---|
| JP | 2005-35732 A | 2/2005 |

* cited by examiner

*Primary Examiner*—Fred Teskin
(74) *Attorney, Agent, or Firm*—Birch, Stewart, Kolasch, and Birch, LLP

(57) ABSTRACT

A rubber roller, for use in an image-forming apparatus, which is formed by molding a rubber composition into the shape of a roller. In the rubber roller, a complex elastic modulus $E^*$ of rubber and a surface roughness $Rz$ of the rubber roller satisfy a relationship indicated by an equation (1) shown below; and a hardness change of the rubber is set to not more than five points when the rubber ages at 70° C. for eight days:

$7 \times Ln\ E^* - 0.12 \times Rz + 3.0 \leq 10.$   Equation (1)

4 Claims, 1 Drawing Sheet

RUBBER ROLLER FOR IMAGE-FORMING APPARATUS

This nonprovisional application claims priority under 35 U.S.C. §119(a) on Patent Application No(s). 2006-112644 filed in Japan on Apr. 14, 2006, the entire contents of which are hereby incorporated by reference.

FIELD OF THE INVENTION

The present invention relates to a rubber roller for use in an image-forming apparatus such as office automation apparatuses including an inject printer, a laser printer, an electrostatic copying machine, a facsimile apparatus, an automatic teller machine (ATM), and the like.

The following rubber rollers are used for the image-forming apparatus: A charging roller for uniformly charging a photoreceptor, a developing roller for attaching toner to the photoreceptor, a transfer roller for transferring a toner image from the photoreceptor to paper, a toner supply roller for feeding the toner, a driving roller for driving a transfer belt at an inner side thereof, a roller (called paper supply roller, paper feeding roller, paper discharge roller) for feeding paper (thin materials other than paper).

The rubber roller for use in the image-forming apparatus is demanded to keep a high coefficient of friction for a long time. Because there is an increase in personal office automation apparatuses, various kinds of paper are fed to the paper-feeding roller. There is a growing demand for providing the paper-feeding roller with a high coefficient of friction so that it obtains a stable paper-feeding performance for various kinds of paper.

To provide the paper-feeding roller with a high coefficient of friction, proposals of lowering the hardness of the rubber roller have been made.

But lowering the hardness of the rubber roller causes the wear resistance thereof to deteriorate. To lower the hardness thereof, it is necessary to add a large amount of oil serving as a softener to a rubber component thereof. Consequently the oil bleeds and deposits on the surface of the rubber roller. As a result, the trace of the rubber roller is left on paper on which the image of an original document has been printed.

To solve the above-described problems, there is proposed a rubber roller composed of not less than two layers so that it has high coefficient of friction and wear resistance. The inner layer of the rubber roller is made of a soft material such as sponge, whereas the outer layer thereof is made a comparatively hard material. But the rubber roller has a problem that it is necessary to increase the number of processes and hence manufactured at a high cost.

To solve the above-described problems, the present applicant proposed the rubber roller which has high coefficient of friction and wear resistance and can be manufactured at a low cost, as disclosed in Japanese Patent Application Laid-Open No. 2005-35732. In the rubber roller used as a paper-feeding roller, the shaft is inserted into the hollow portion thereof. The inner peripheral surface of the rubber roller is formed as a pear-skin surface or a knurled surface. The surface roughness Rmax of the inner peripheral surface of the rubber roller is set to not less than 0.05 mm nor more than 2.0 mm. The surface roughness Rmax of the inner peripheral surface thereof is set above the surface roughness Rmax of the peripheral surface thereof. The Shore A hardness of the rubber roller in conformity to JIS K6253 is set to not less than 20 nor more than 60.

It is essential to prevent the drop of the coefficient of friction of the rubber roller when the rubber roller mounted on the image-forming apparatus is in operation. In addition, to improve the performance of the rubber roller, it is necessary to pay attention to the drop of the coefficient of friction during a period of time in which it is stored. The storage period of time means a term from the time when the rubber roller is manufactured until the time when the rubber roller incorporated in the image-forming apparatus starts to operate while it is displaying its function.

The coefficient of friction of the rubber roller becomes lower than that expected at the beginning, when a long period of time elapses from the time when the rubber roller is manufactured until the time when the rubber roller is incorporated in the image-forming apparatus and from the time when it is incorporated in the image-forming apparatus and sold and installed until the time when it starts to operate. This may cause the occurrence of a disadvantage such as unfeeding of paper.

It has been reported that the coefficient of friction of the rubber roller drops in the storage period of time because a softener (oil) and chemicals contained in the rubber roller migrate to the surface thereof. But the mechanism of the drop of the coefficient of friction has not been clarified.

The rubber roller for printing use is disclosed in Japanese Patent Application Laid-Open No. 2003-154631 (patent document 2). Description is made on the numerical range of the tan δ indicated by the ratio between the storage elastic modulus E' and the loss elastic modulus E" in the complex elastic modulus E*. But no description is made on the fact that the property indicated by the above-described numerical range of the tan δ is related to the drop of the coefficient of friction of the rubber roller in the period of time in which the rubber roller for use in an image-forming apparatus is stored.

As the method of examining the extent of the drop of the coefficient of friction during the storage period of time, it is often carried out a reliability test. The reliability test is conducted to examine a change of the coefficient of friction by measuring it after the rubber roller is left in various environment. But it takes much time and labor to conduct the test, which presents a major obstacle in shortening of a development period of time.

Patent Document 1: Japanese Patent Application Laid-Open No. 2005-35732

Patent Document 2: Japanese Patent Application Laid-Open No. 2003-154631

SUMMARY OF THE INVENTION

The present invention has been made in view of the above-described problems. Therefore it is an object of the present invention to provide a rubber roller whose coefficient of friction hardly drops in a period of time in which the rubber roller is stored.

The present inventors have energetically investigated to solve the above-described problems and found that it is possible to effectively prevent a drop of the coefficient of friction of a rubber roller during a storage period of time by setting a specific numerical value range indicating the physical property of the rubber roller and the surface roughness thereof irrespective of a material thereof.

Based on the above-described finding, the present invention provides a rubber roller, for use in an image-forming apparatus, which is formed by molding a rubber composition into the shape of a roller. In the rubber roller, a complex elastic modulus $E^*$ of rubber and a surface roughness Rz of the rubber roller satisfy a relationship indicated by an equation (1) shown below; and a hardness change of the rubber is set to not more than five points when the rubber ages at 70° C. for eight days.

$$7 \times Ln(E^*) - 0.12 \times Rz + 3.0 \leq 10 \qquad \text{Equation (1).}$$

When the value of the equation (1) exceeds 10, the coefficient of friction of the rubber roller drops greatly after the storage period of time. As a result, when the rubber roller is used as a paper-feeding roller, problems such as unfeeding of paper may occur. The value of the equation (1) is more favorably not more than 9.5.

Although a lower limit value of the equation (1) is not restricted, but favorably not less than −10 and more favorably not less than 0.

To compute the value of the equation (1), in accordance with JIS K6394, the complex elastic modulus $E^*$ of the rubber is measured at a temperature of 23° C. and a frequency of 10 Hz by cutting out a sample from the rubber roller.

In accordance with JIS B0601, the surface roughness Rz of the rubber roller is measured on the peripheral surface thereof under conditions of a measuring length of 3.0 mm, a cut-off of 0.8 mm, and a speed of 0.60 mm/second.

When the value of the equation (1) is less than 10, the range of the complex elastic modulus $E^*$ of the rubber and that of the surface roughness Rz of the rubber roller are not restricted to a specific value respectively.

But the range of the complex elastic modulus $E^*$ of the rubber is set to favorably 0.1 to 20 MPa and more favorably 0.5 to 15 MPa. If the complex elastic modulus $E^*$ of the rubber is below 0.1 MPa, a problem that the hardness of the rubber roller is insufficient may occur. On the other hand, if the complex elastic modulus $E^*$ of the rubber is above 15 MPa, a problem that the hardness of the rubber roller is too hard may occur.

A preferable range of the numerical value of the surface roughness Rz of the rubber roller is different according to application thereof and thus cannot be said limitedly. When the rubber roller is used as a toner supply roller for transporting toner, a developing roller, and a transfer roller, it is preferable that the surface roughness Rz of the rubber roller is set to the range of not less than 1 μm nor more than 10 μm. When the rubber roller is used as the paper-feeding roller, it is preferable that the surface roughness Rz thereof is set to the range of not less than 10 μm nor more than 100 μm.

When the rubber of the rubber roller of the present invention ages at 70° C. for eight days, a hardness change of the rubber is set to not more than five points.

Although the hardness change of the rubber is examined for a comparatively short period of time of eight days (192 hours), it is possible to reliably evaluate the drop of the coefficient of friction of the rubber roller during the storage period of time by examining the above-described properties in combination with the above-described characteristic that the hardness change of the rubber is not more than five points when the rubber ages at 70° C. for eight days. Thereby it is possible to reduce the period of time and the amount of labor conventionally required to conduct a reliability test.

If the hardness change of the rubber is more than five points when the rubber ages at 70° C. for eight days, the coefficient of friction of the rubber roller drops greatly during the storage period of time, even if the value of the equation (1) is less than 10.

The lower limit value of the hardness change of the rubber is not specifically restricted, but should be not less than zero point.

The hardness change of the rubber of the rubber roller of the present invention is measured in the following conditions.

Initially in accordance with JIS K6253, an initial hardness of the rubber is measured.

Thereafter in accordance with JIS K6257, after the rubber roller is left in an oven at 70° C. for eight days, it is taken out of the oven and left at a room temperature for 24 hours. In accordance with JIS K6253, the hardness of the rubber is measured at an atmospheric temperature of 23° C. to obtain the hardness thereof after it ages by heating.

The hardness change of the rubber is obtained by computing the difference between the hardness thereof after it ages by heating and the initial hardness thereof.

The hardness of the rubber roller of the present invention after the rubber ages by heating is set to the range of favorably 20 to 70 and more favorably 25 to 65 in the Shore A hardness of JIS K6257.

The hardness of the rubber of the rubber roller after the rubber ages by heating serves as a numerical value indicating the hardness thereof when the rubber roller operates after the storage period of time. When the hardness of the rubber after it ages by heating is less than 20, the abrasion amount thereof is large owing to use. On the other hand, when the hardness of the rubber after the rubber ages by heating is more than 70, the rubber roller has an insufficient coefficient of friction. Consequently when the rubber roller is used as the paper-feeding roller, there arises a problem that it fails to feed paper while it is operating.

In the present invention, the composition of the rubber composition constructing the rubber roller is not limited to a specific composition so long as the rubber roller is capable of displaying the above-described properties.

The rubber composition constructing the rubber roller of the present invention contains a rubber component. The rubber component is not specifically limited, but known elastomers can be used as the rubber component. It is possible to list the following known elastomers: ethylene-propylene-diene rubber (hereinafter referred to as EPDM rubber), butadiene rubber, isoprene rubber, chloroprene rubber, natural rubber, acrylonitrile-butadiene rubber (NBR), styrene-butadiene rubber, styrene rubber, butyl rubber, halogenated butyl rubber, polyisobutylene, chlorosulfonated polyethylene rubber, acrylic rubber, urethane rubber, silicone rubber, polyether copolymers, and epichlorohydrin copolymers. These elastomers may be used singly or as mixtures of two or more of these elastomers.

A preferable rubber component is different according to an application of the rubber roller of the present invention and thus cannot be said limitedly. For example, when the rubber roller of the present invention is used as the paper-feeding roller, diene rubber or EPDM is preferable. The EPDM is especially favorable.

As the diene rubber that is used in the present invention, it is possible to list natural rubber (NR), butyl rubber (IIR), isoprene rubber (IR), butadiene rubber (BR), styrene-butadiene rubber (SBR), chloroprene rubber (CR), acrylonitrile-butadiene rubber (NBR), and 1,2-polybutadiene. These diene rubbers may be used singly or as mixtures of two or more of the diene rubbers.

The EPDM rubber includes an unextended type consisting of a rubber component and an extended type containing the rubber component and extended oil. Both the unextended type and the extended type can be used in the present invention. As examples of diene monomers in the EPDM rubber, dicyclopentadiene, methylenenorbornene, ethylidenenorbornene, 1,4-hexadiene, and cyclooctadiene are listed.

When the rubber roller is used as the toner supply roller for transporting toner, the developing roller, and the transfer roll, ionic-conductive rubber is suitable as the rubber component thereof.

As the ionic-conductive rubber, a rubber material having a polar group in its composition can be used. More specifically, epichlorohydrin copolymers or polyether copolymers can be preferably used.

As the epichlorohydrin copolymers, it is possible to list an epichlorohydrin homopolymer, an epichlorohydrin-ethylene oxide copolymer, an epichlorohydrin-propylene oxide copolymer, an epichlorohydrin-allyl glycidyl ether copolymer, an epichlorohydrin-ethylene oxide-allyl glycidyl ether copolymer, epichlorohydrin-propylene oxide-allyl glycidyl ether copolymer, and an epichlorohydrin-ethylene oxide-propylene oxide-allyl glycidyl ether copolymer.

As the polyether copolymers, it is possible to list ethylene oxide-propylene oxide-allyl glycidyl ether terpolymer, an ethylene oxide-allyl glycidyl ether copolymer, a propylene oxide-allyl glycidyl ether copolymer, and an ethylene oxide-propylene oxide copolymer.

These ionic conductive rubber may be used singly or as mixtures of two or more of these ionic conductive rubber.

The rubber composition constructing the rubber roller of the present invention may contain other components other than the above-described rubber components. A vulcanizing agent, a vulcanizing accelerator, a softener, and a filler are listed as the other components. The kind and mixing amount thereof are so selected and determined that the rubber roller of the present invention has the above-described properties.

As the vulcanizing agent, it is possible to use a sulfur-based vulcanizing agent, a thiourea-based vulcanizing agent, triazine derivatives, peroxides, resin crosslinking agent and monomers. These vulcanizing agents can be used singly or in combination of two or more of them.

As the sulfur-based vulcanizing agent, it is possible to use powdered sulfur, organic sulfur-containing compounds such as tetramethylthiuram disulfide, N,N-dithiobismorpholine, and the like.

As the thiourea-based vulcanizing agent, it is possible to use tetramethylthiourea, trimethylthiourea, ethylenethiourea, and thioureas shown by $(C_nH_{2n+1}NH)_2C=S$ (n=integers 1 to 10).

As the peroxides, it is possible to list benzoyl peroxide, 1,1-bis (tert-butyl peroxy)-3,3,5-trimethylcyclohexane, 2,5-dimethyl-2,5-di-(benzoyl peroxy)hexane, di(tert-butyl peroxy)di-isopropylbenzene, 1,4-bis[(tert-butyl)peroxy isopropyl]benzene, di(tert-butyl peroxy)benzoate, tert-butyl peroxybenzoate, dicumyl peroxide, tert-butyl cumyl peroxide, 2,5-dimethyl-2,5-di(tert-butyl peroxy)hexane, di-tert-butyl peroxide, 2,5-dimethyl-2,5-di(tert-butylperoxy)-3-hexene.

The resin crosslinking agent is synthetic resin which is heated to allow rubber to make a crosslinking reaction. As the resin crosslinking agent, it is possible to list phenol resin, melamine·formaldehyde resin, triazine·formaldehyde condensate, hexamethoxymetyl·melamine resin.

The mixing amount of the vulcanizing agent is different according to the kind thereof and thus cannot be said limitedly. But it is preferable that the mixing amount of the vulcanizing agent for 100 parts by mass of the rubber component is set to not less than 0.1 parts by mass nor more than 20 parts by mass. In the case of the resin crosslinking agent, it is preferable that the mixing amount of the vulcanizing agent for 100 parts by mass of the rubber component is set to the range of 1 to 15 parts by mass. In the case of vulcanizing agents other than the resin crosslinking agent, it is preferable that the mixing amount of the vulcanizing agent for 100 parts by mass of the rubber component is set to the range of 0.5 to 5 parts by mass.

In dependence on the kind of the vulcanizing agent, a vulcanizing accelerating agent or a vulcanizing accelerating assistant agent may be added to the rubber component.

As the vulcanizing accelerating agent, it is possible to use inorganic accelerating agents such as slaked lime, magnesia (MgO), and litharge (PbO); and organic accelerating agents shown below. The organic accelerating agent includes guanidines such as di-ortho-tolylguanidine, 1,3-diphenyl guanidine, 1-ortho-tolylbiguanide, salts of the di-ortho-tolylguanidine of dicatechol borate; thiazoles such as 2-melcapto·benzothiazole, dibenzothiazyl disulfide, and the like; sulfenamides such as N-cyclohexyl-2-benzothiazyl-sulfenamide; thiurams such as tetramethylthiuram monosulfide, tetramethylthiuram disulfide, tetraethylthiuram disulfide, and dipentamethylenethiuram tetrasulfide; and thioureas. It is possible to use the above-described vulcanizing accelerating agent singly or in combination.

The mixing amount of the vulcanizing accelerating agent for 100 parts by mass of the rubber component is favorably not less than 0.5 nor more than five parts by mass and more favorably not less than 0.5 nor more than two parts by mass.

The following vulcanizing accelerating assistants can be used: metal oxides such as zinc white; fatty acids such as stearic acid, oleic acid, cotton seed fatty acid, and the like; and known vulcanizing accelerating assistants.

The addition amount of the vulcanizing accelerating agent for 100 parts by mass of the rubber component is favorably not less than 0.5 parts by mass nor more than 10 parts by mass and more favorably not less than two parts by mass nor more than eight parts by mass.

A co-crosslinking agent may be added to the rubber component when the organic peroxide is used as the vulcanizing agent. The co-crosslinking agent crosslinks itself and reacts with molecules of the rubber and crosslinks them with one another, thus making the entire rubber component polymeric. By co-crosslinking the rubber component with the co-crosslinking agent, the molecular weights of the crosslinked molecules increase to thereby improve the wear resistance of the rubber composition.

As the co-crosslinking agent, it is possible to list poly-functional monomers, metal salts of methacrylic acid or acrylic acid, methacrylate esters, aromatic vinyl compounds, heterocyclic vinyl compounds, allyl compounds, polyfunctional polymers utilizing the functional group of 1,2-polybutadiene, and dioximes.

When the co-crosslinking agent is added to the rubber component, together with the organic peroxide, the mixing amount of the co-crosslinking agent can be selected appropriately in relation to the kind of the co-crosslinking agent or other components. The mixing amount of the co-crosslinking agent for 100 parts by mass of the rubber component is favorably not less than 5 parts by mass nor more than 20 parts by mass and more favorably not less than 10 parts by mass nor more than 15 parts by mass.

As the softener, petroleum-based softeners and plasticizers can be used. As the petroleum-based softeners, it is possible to use mineral oil such as aromatic oil, naphthenic oil, paraffin oil; and known synthetic oil consisting of hydrocarbon oligomer; and process oil. As the plasticizer, it is possible to use phthalate, adipate, sebacate, phosphate, polyether, and polyester plasticizers. In the present invention, the paraffin oil is preferable as the softener.

The mixing amount of the softener for 100 parts by mass of the rubber component is favorably not less than 10 parts by mass nor more than 250 parts by mass and more favorably not less than 10 parts by mass nor more than 150 parts by mass.

As the filler, it is possible to list the following powdery substances such as titanium oxide, zinc oxide, silica, carbon, carbon black, clay, talc, calcium carbonate, magnesium carbonate, aluminum hydroxide, and alumina. The rubber composition containing the filler is allowed to have an improved mechanical strength and the like. The rubber roller composed of the rubber composition containing alumina or titanium oxide has a high thermal conductivity. Thus it is possible to release generated heat and thus improve the wear resistance thereof.

The mixing amount of the filler for 100 parts by mass of the rubber component is favorably not less than 1 nor more than 80 parts by mass and more favorably not less than 5 nor more than 60 parts by mass.

In addition to the above-described components, the rubber composition composing the rubber roller of the present invention may contain the following additives unless the use thereof does not depart from the object of the present invention: a processing aid, a deterioration retarder, a scorch retarder, an ultraviolet ray absorber, a lubricant, a pigment, an antistatic agent, a flame retardant, a neutralizer, a core-forming agent, a foam prevention agent, and the like.

The rubber component of the rubber composition composing the rubber roller of the present invention may be dispersed in a mixture of a thermoplastic elastomer and thermoplastic resin by dynamic crosslinking.

In adopting the above-described mode, it is preferable that the rubber component contains the diene rubber or the EPDM rubber as the main component thereof. It is especially preferable to use the EPDM rubber as the main component of the rubber component and set the mixing amount thereof for the entire rubber component to favorably not less than 50 mass %, more favorably not less than 80 mass %, and most favorably in the range of 95 to 100 mass %.

Known thermoplastic elastomers can be used as the above-described thermoplastic elastomer. More specifically, it is possible to list styrene elastomer, chlorinated polyethylene, vinyl chloride elastomer, olefin elastomer, urethane elastomer, ester elastomer, amide elastomer, ionomer, ethylene ethyl acrylate resin (EEA), and ethylene-vinyl acetate copolymer (EVA). It is preferable to use the styrene elastomer.

As the thermoplastic resin, known thermoplastic resin can be used. For example, it is possible to use olefin resin, polystyrene (PS), polyethylene terephthalate (PET), polybutylene terephthalate (PBT), and nylon. It is preferable to use the olefin resin.

It is preferable to that the rubber composition of the present invention contains 2 to 150 parts by mass of a mixture of the thermoplastic elastomer and the thermoplastic resin for 100 parts by mass of the rubber component.

As a crosslinking agent for dynamically crosslinking the rubber component, it is possible to use a known crosslinking agent such as a resin crosslinking agent or a peroxide crosslinking agent.

As the method of manufacturing the rubber roller of the present invention, known methods can be adopted.

For example, the rubber component and other components including the vulcanizing agent and the like are supplied to a kneading machine such as a twin screw extruder, an open roll, a Banbury mixer, a kneader, and the like to knead them by heating them as desired. An obtained rubber composition is set in a die to press-vulcanize it at a desired temperature, for example, at 150° C. to 190° C. Thereby a tube (cot) is obtained. Needless to say, a molding method such as an injection molding method may be adopted.

The surface of the tube is polished with a cylindrical grinder, with the metal shaft inserted into the tube. The degree of the surface roughness of the rubber roller is controlled by varying the polishing condition. Finally the tube is cut to a desired length. Thereby the rubber roller of the present invention is obtained.

The rubber roller of the present invention is not limited in its use but can be used as any of the following rollers, provided that it can be incorporated in the image-forming apparatus.

For example, the rubber roller of the present invention can be used as the paper-feeding roller (more specifically, rollers constituting paper supply mechanism, for example, paper supply roller, feeding roller, and paper discharge roller) contributing to transport of paper, a cleaning roller for removing residual toner, a charging roller having a cleaning function, a charging roller for uniformly charging a photoreceptor drum, the developing roller for transporting the toner to the photoreceptor, the transfer roller for transferring a toner image from the photoreceptor to a transfer belt or paper, and the toner supply roller for transporting the toner.

In the rubber roller of the present invention, the predetermined relationship is satisfied by the complex elastic modulus $E^*$ of the rubber and the surface roughness Rz of the rubber roller. Further the hardness change of the rubber in a thermosetting test is set to not more than five points. Consequently irrespective of a material of the rubber roller, it is possible to effectively prevent the coefficient of friction thereof from dropping in the storage period of time. Thereby it is possible to solve the problems such as unfeeding of paper which occurs owing to the drop of the coefficient of friction of the rubber roller.

DETAILED DESCRIPTION OF THE PREFERRED EMBODIMENTS

Figure 1:
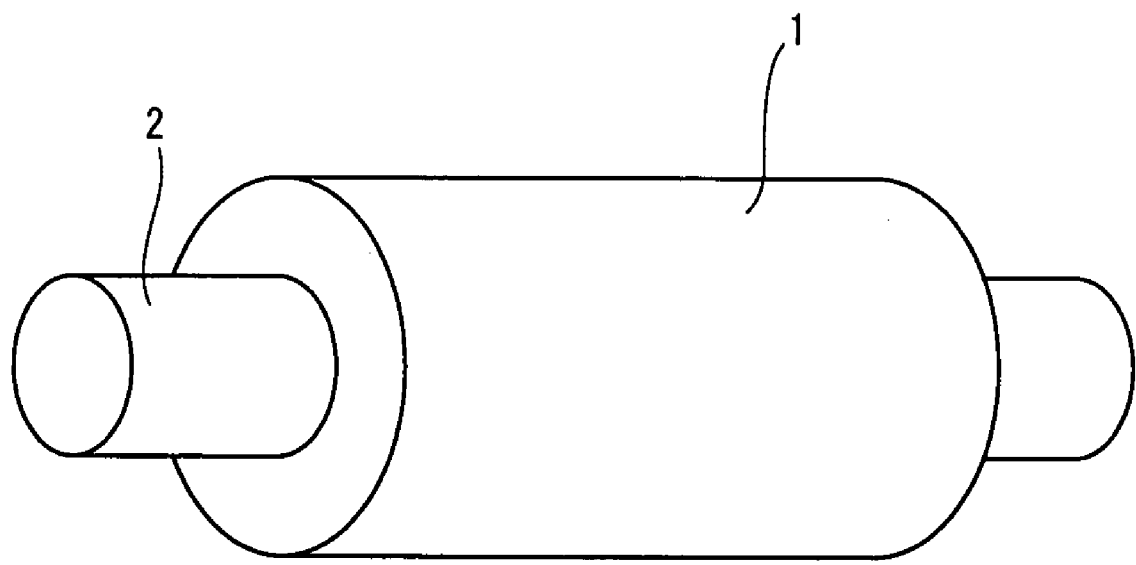
FIG. 1 is a schematic view showing a rubber roller of the present invention.

The embodiment of the present invention will be described below.

FIG. 1 shows a cylindrical rubber roller 1 of an embodiment of the present invention. A circular columnar metal shaft (shaft) 2 is mounted on a hollow portion of the rubber roller 1. The shaft 2 may be fixed to the rubber roller 1 by press fit or bonded thereto with a conductive adhesive agent. The shaft 2 is made of metal such as aluminum, aluminum alloy, SUS, and iron or ceramics.

A rubber composition composing the rubber roller contains EPDM as the rubber component thereof. The rubber composition contains a vulcanizing agent, a softener, and a filler in addition to the rubber component.

As the vulcanizing agent, peroxides are favorable. Dicumyl peroxide is especially favorable. The mixing amount of the vulcanizing agent is favorably 0.5 to 10 parts by mass and more favorably 1 to 5 parts by mass for 100 parts by mass of the rubber component.

As the softener, mineral oil is preferable. Paraffin oil is most favorable than other mineral oils. The mixing amount of the softener is favorably 10 to 100 parts by mass and more favorably 20 to 60 parts by mass for 100 parts by mass of the rubber component.

Titanium oxide, carbon black, and calcium carbonate are listed as preferable fillers. The mixing amount of the filler is favorably 1 to 50 parts by mass and more favorably 10 to 40 parts by mass for 100 parts by mass of the rubber component.

The above-described components are kneaded to form a rubber composition. The obtained rubber composition is press-vulcanized in a die at 165 to 175° C. to form a tube (cot). After the shaft 2 is inserted into the tube, the surface of the tube is polished with a cylindrical grinder. Finally the tube is cut into a desired length to obtain the rubber roller 1.

The rubber roller 1 obtained in this manner has the following properties:

The value of the equation (1) computed from the complex elastic modulus $E^*$ of the rubber and the surface roughness Rz of the rubber roller falls in the range of 5 to 9.5. The complex elastic modulus $E^*$ is set to 1 to 15 MPa and favorably in the range of 1.5 to 10 MPa. The surface roughness Rz of the rubber roller is set to the range of 10 to 60 μm.

The hardness change of the rubber when the rubber ages at 70° C. for eight days is set to not more than five points.

The Shore A hardness after the rubber ages by heating is set to 30 to 60.

The rubber roller 1 is used as the paper-feeding roller which is so constructed as not to fail to feed paper in the paper-feeding test described in examples.

EXAMPLES

The present invention is described in detail below with reference to the examples of the present invention and comparison examples.

Rubber rollers of the examples and comparison examples were made by using rubber compositions containing the components shown in table 1. The properties of the rubber rollers were measured by using a method described later. Table 1 shows the results.

The following products commercially available were used as the components shown in table 1:
EPDM rubber: "Esprene 505A" produced by Sumitomo Chemical Co., Ltd.
Softener (oil): Paraffin process oil ("Diana process oil PW-380" produced by Idemitsu Kosan Co., Ltd.)
Filler A: Calcium carbonate ("BF300" produced by Bihoku Funka Kogyo Co., Ltd.)
Filler B: Titanium oxide ("Kronos Titanium Oxide KR-380" produced by Titan Kogyo Co., Ltd.)
Filler C: Carbon black ("SEAST3 HAF" produced by Tokai Carbon Co., Ltd.)
Crosslinking assistant: ("PERCUMYL D" produced by NOF CORPORATION)

The rubber rollers were manufactured in the following steps:

After the weights of the components were measured, they were supplied in the amounts shown in table 1 to a kneader to obtain a rubber composition.

Each of the obtained rubber compositions was supplied to a die to press-vulcanize them at 170° C. for 20 minutes. Thereby tubes (cot) were obtained. The tube had an inner diameter of 24 mm, an outer diameter of 32 mm, and a length of 70 mm.

After each tube into which a metal shaft was inserted was set on a cylindrical grinder, the surface thereof was polished to form polishing marks thereon. The degree of the surface roughness of each rubber roller was controlled by varying the polishing condition. The outer diameter of the rubber roller was 30 mm after its surface was polished.

Finally each rubber roller was cut to set its length to 15 mm. Thereby the rubber rollers were obtained.

Methods of examining the performance of each rubber roller are shown below.

Measurement of Complex Elastic Modulus $E^*$

In accordance with JIS K6394, a sample was cut out from each rubber roller to measure the complex elastic modulus $E^*$ thereof at a temperature of 23° C. and a frequency of 10 Hz.

Measurement of Surface Roughness Rz

In accordance with JIS B0601, the surface roughness Rz of each rubber roller was measured on the peripheral surface thereof under conditions of a measuring length of 3.0 mm, a cut-off of 0.8 mm, and a speed of 0.60 mm/second.

Measurement of Initial Hardness

In accordance with JIS K6253, the initial hardness of each rubber roller was measured at an atmospheric temperature of 23° C.

TABLE 1

|  | Comparison Example 1 | Comparison Example 2 | Comparison Example 3 | Example 1 | Example 2 | Example 3 |
| --- | --- | --- | --- | --- | --- | --- |
| EPDM | 100 | 100 | 100 | 100 | 100 | 100 |
| Softener | 50 | 160 | 30 | 50 | 40 | 30 |
| Filler A | 10 | 20 | 15 | 10 | 10 | 15 |
| Filler B | 3 | 40 | 20 | 3 | 15 | 20 |
| Filler C | 2 | 2 | 2 | 2 | 2 | 2 |
| Crosslinking agent | 2 | 4 | 3 | 2 | 3 | 3 |
| Complex elastic modulus $E^*$ | 3.1 | 3.2 | 6.4 | 3.1 | 4.5 | 6.4 |
| Surface roughness Rz | 5 | 21 | 21 | 21 | 42 | 54 |
| Value of equation (1) | 10.3 | 8.6 | 13.5 | 8.4 | 8.5 | 9.5 |
| Initial hardness | 39 | 39 | 51 | 39 | 46 | 51 |
| Hardness after ageing | 42 | 46 | 53 | 42 | 49 | 53 |
| Change of hardness | 3 | 7 | 2 | 3 | 3 | 2 |
| Paper-feeding test | X | X | X | ○ | ○ | ○ |

Measurement of Hardness After Aging

In accordance with JIS K6257, after each rubber roller was left in an oven at 70° C. for eight days, each rubber roller was taken out of the oven and left at a room temperature for 24 hours. In accordance with JIS K6253, the hardness of each rubber roller was measured at an atmospheric temperature of 23° C.

Paper-Feeding Test

After the rubber rollers were mounted on a copying machine before they age by heating, 10 sheets of paper (PPC paper produced by Fuji Xerox Office Supply Co., Ltd.) of a size A4 were supplied to the copying machine at a temperature of 23° C. and a relative humidity of 55%. Because the initial coefficients of friction of the rubber rollers were different from one other, the degree of a load applied to each rubber roller was set according to the initial coefficient of friction thereof.

Each of the aging rubber rollers was mounted on the copying machine set on paper supply conditions of the initial rubber rollers. 10 sheets of paper of a size A4 were supplied to the copying machine at a temperature of 23° C. and a relative humidity of 55%. The paper-feeding state of each rubber roller was observed to evaluate the paper-feeding performance thereof. Rubber rollers which did not have problems in the paper-feeding state were marked by ○, whereas those which failed to feed paper were marked by X.

As shown in table 1, the rubber rollers of the examples 1 through 3 of the present invention were all marked by ○ in the paper-feeding test. On the other hand, the rubber rollers of the comparison examples 1 through 3 were all marked by X. The results indicate that the coefficients of friction of the rubber rollers of the examples 1 through 3 did not drop after the predetermined storage period of time and did not fail to feed paper when they started to operate. That is, they were excellent in the paper-feeding performance.

What is claimed is:

1. A rubber roller, for use in an image-forming apparatus, which is formed by molding a rubber composition into a shape of a roller, wherein a complex elastic modulus $E^*$ of rubber and a surface roughness $Rz$ of said rubber roller satisfy a relationship indicated by an equation (1) shown below; and a hardness change of said rubber is set to not more than five points, when said rubber ages at 70° C. for eight days:

$$7 \times Ln\, E^* - 0.12 \times Rz + 3.0 \leq 10 \qquad \text{Equation (1)}.$$

2. The rubber roller according to claim 1, wherein said complex elastic modulus $E^*$ of said rubber is set to 1 to 10 MPa; said surface roughness $Rz$ of said rubber roller is set to 10 to 100 μm; and a Shore hardness of JIS K6253 after said rubber ages is set to 20 to 70.

3. The rubber roller according to claim 1, wherein said rubber composition contains ethylene-propylene-diene rubber.

4. The rubber roller according to claim 2, wherein said rubber composition contains ethylene-propylene-diene rubber.

* * * * *